United States Patent [19]

Galli et al.

[11] Patent Number: 4,923,481

[45] Date of Patent: May 8, 1990

[54] AQUEOUS DISPERSION OF A METALLIZABLE DYE AND SULFONATED AROMATIC CONDENSATE

[75] Inventors: Roberto Galli, Reinach; Ernst Tempel, Riehen, both of Switzerland

[73] Assignee: Ciba-Geigy Corporation, Ardsley, N.Y.

[21] Appl. No.: 285,845

[22] Filed: Dec. 16, 1988

[30] Foreign Application Priority Data

Dec. 18, 1987 [CH] Switzerland ............................ 495687

[51] Int. Cl.$^5$ ........................ C09B 67/26; D06P 1/36; D06P 3/20

[52] U.S. Cl. ........................................... 8/589; 8/527; 8/610; 8/680; 8/681; 8/685; 8/917; 8/924; 8/436

[58] Field of Search ..................... 8/527, 589, 610, 685

[56] References Cited

U.S. PATENT DOCUMENTS 3,004,072  10/1961  Doedens et al. .................. 568/639
4,110,073  8/1978  Mollet et al. ........................ 8/549
4,202,838  5/1980  Lauton et al. ...................... 8/589

FOREIGN PATENT DOCUMENTS 2101222  7/1971  Fed. Rep. of Germany .

Primary Examiner—A. Lionel Clingman
Attorney, Agent, or Firm—George R. Dohmann; Edward Mc C. Roberts

[57] ABSTRACT

Aqueous dispersion of a sulfonated metallizable dye containing (a) based on the total weight at least 10% of the sulfonated metallizable dye and
(b) a sulfonated condensation product obtained by reacting an aromatic compound having at least two replaceable ring-positioned hydrogen atoms in any desired order with a compound of the formula

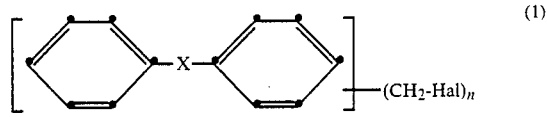

in which X is a direct bond or oxygen, Hal is chlorine or bromine and n is 1 to 4, and sulfonation.

15 Claims, No Drawings

AQUEOUS DISPERSION OF A METALLIZABLE DYE AND SULFONATED AROMATIC CONDENSATE

The present invention relates to an aqueous dispersion of a sulfonated metallizable dye, to processes for preparing said dispersion and to the use thereof for dyeing carboxamido containing fibres such as synthetic polyamide fibres, leather and in particular wool in cheese dyeing.

The aqueous dispersion according to the invention contains (a) based on the total weight at least 10% of the sulfonated metallizable dye and (b) a sulfonated condensation product obtained by reacting an aromatic compound having at least two replaceable ring-positioned hydrogen atoms in any desired order with a compound of the formula

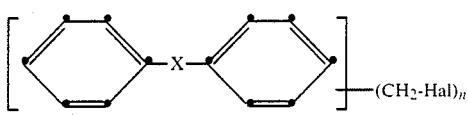

in which X is a direct bond or oxygen, Hal is chlorine or bromine and n is 1 to 4, and sulfonation.

The dye dispersion according to the invention is primarily a storable liquid commercial form of an afterchroming dye, i.e. of a dye which contains groupings suitable for metal complex formation and where the chroming takes place during or after dyeing. Suitable dyes of this type are the customary mordant dyes, for example the mordant dyes mentioned in the Colour Index, volume 3 (3rd edition, 1971) on pages 3001–3224. Preferred dyes are mordant blacks, in particular Mordant Black 11 C.I. 14645. It is also possible to use mixtures of these mordant dyes.

Preferably, the liquid formulation according to the invention contains the dye in amounts of 20 to 60, in particular 25 to 40, percent by weight, based on the total weight of the formulation.

The sulfonated condensation products usable as component (b) preferably conform to the formula

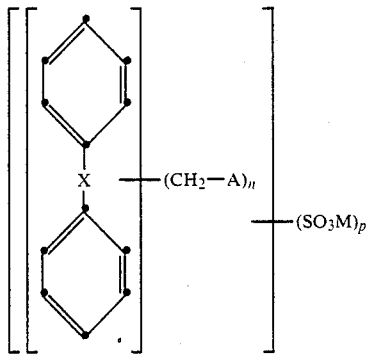

in which X is a direct bond or oxygen, A is the radical of an aromatic compound which is bonded to the methylene group by means of a ring carbon atom, M is hydrogen or a cation, for example an alkali metal, an alkaline earth metal or an ammonium group, and n and p are each a number from 1 to 4.

Within this range n and p are preferably each 1 or 2, or they can each be any desired fractional number from 1 to 4, for example 1.4, 1.8, 2.1 or 3.2.

The sulfonated condensation products usable according to the invention are advantageously prepared by reacting an aromatic compound having at least two replaceable ring-positioned hydrogen atoms with a compound of the formula (1) and sulfonating the condensation product. Condensation products of the specified type can also be prepared by reacting a sulfonated aromatic compound having at least two replaceable ring-positioned hydrogen atoms with a compound of the formula (1).

The aromatic compounds having at least two replaceable hydrogen atoms that serve as starting materials in the preparation of the condensation products, can be monocyclic or polycyclic, in particular bicyclic, hydrocarbons, which can be substituted. Possible substituents are for example hydroxy, alkyl groups having 1 to 4 carbon atoms, alkoxy groups having 1 to 4 carbon atoms or halogen, for example chlorine. Preference is given to naphthalene compounds which can be substituted by hydroxy, chlorine or methyl. Examples of monocyclic and polycyclic aromatic compounds are: alkylbenzenes, e.g. toluene, xylenes, isopropylbenzene, isobutylbenzene and tert-butylbenzene, phenol, chlorophenols, alkylphenols, e.g. methylphenol, dimethylphenol, isopropylphenol or tert-butylphenol, hydroxybiphenyls, alkoxybenzenes, e.g. anisoles, phenetoles and butoxybenzene, biphenylalkanes, hydroxybiphenylalkanes, tetrahydronaphthalene, naphthalene, α- and β-naphthol, alkylnaphthalenes, e.g. α- and β-methylnaphthalene, and also acenaphthene, anthracene, perylene, pyrene, dihydrophenanthrene or phenanthrene. Naphthalene which can also be previously sulfonated is particularly suitable. It is, of course, also possible to use mixtures of these monocyclic and polycyclic aromatic compounds as starting materials.

The compounds of the formula (1) which are likewise required as starting materials are prepared, for example by reacting biphenyl or diphenyl ether with formaldehyde and a hydrogen halide, such as hydrogen bromide or preferably chloride, by the methods described in U.S. Pat. No. 3,004,072 or Italian Patent No. 600,214.

Preferred starting materials of the formula (1) are chloromethyl biphenyl ether and chloromethyl diphenyl ether. These compounds usually comprise mixed isomers having 1 to 3 chloromethyl groups, the chloromethyl groups preferably being for example in the o- and p-position of the two benzene rings. Accordingly, the corresponding sulfonated condensation products are generally also present in the form of mixtures, in particular of mono- to trisubstituted biphenyl or diphenyl ether products. Depending on the starting materials and the reaction conditions chosen in the preparation of the condensation products, the ratio between the isomers will vary. If n is 1, p-isomers are obtained in proportions of for example 30 to 90% and o-isomers in proportions of for example 70 to 10%. If n is 2, p,p'-, o,o'- or o,p' compounds are obtained for example.

The sulfonated condensation products are described in DE Offenlegungsschrift No. 2,353,691 where further details can be found.

The dye dispersion according to the invention advantageously contains at least 5 parts by weight of sulfonated condensation product per 100 parts weight of dye. However, it is preferable to use 15 to 40 parts by weight in order to obtain a stable and concentrated dye formulation and at the same time to avoid thickening on dispersing and grinding. Particular preference is given to 15 to 25 parts by weight.

Although the mixtures described are already satisfactory, they can additionally contain further anionic dispersants.

Suitable additional dispersants are for example

Condensation products obtainable from phenolic and-/or sulfonated aromatics and formaldehyde, the sulfonation being carried out before or after the condensation.

Condensation products of naphthalenesulfonic acid and/or naphtol- or naphthylamine-sulfonic acid and formaldehyde.

Condensation products of phenolsulfonic acids and/or phenols with formaldehyde and urea.

Condensation products of phenols, naphtholsulfonic acids, sodium sulfite and formaldehyde, in particular of cresol, 2-naphthol-6-sulfonic acid, sodium sulfite and formaldehyde (Fiat Report 1013).

Condensation products of sulfo-containing monocyclic phenols and formaldehyde.

Condensation products of bicyclic, unfused mono- or bifunctional phenols and formaldehyde.

Condensation products of sulfo-free monocyclic phenols, formaldehyde and sulfite.

The weight ratio of sulfonated condensation product (component (b)):additional anionic dispersant is advantageously 10:1 to 2:1, preferably 6:1 to 3:1.

To set the pH and to improve the properties of the dispersions according to the invention, various further additives can be used. This formulation thus contains sodium hydrogensulfate in such an amount (advantageously 0 to 5%, preferably 0.05 to 1%) that the pH of the formulation is in general 1 to 4, preferably 1.5 to 3.

The formulation can further contain alkylene glycols, in particular 1,2-propylene glycol, advantageously in an amount of 1 to 20% by weight, preferably 3 to 10% by weight, and electrolytes (for example sodium chloride or sodium sulfate), urea, foam prevention agents and/or thickeners. It can contain up to about 10 percent by weight, but preferably up to at most 1.5 percent by weight, of these last-mentioned additives.

The novel liquid formulation is a genuine dispersion. It has a high concentration of dye, it is pourable and meterable at 25° C., having a viscosity of less than 2500 mPa.s (12 rpm), it is storable for several months, and it is miscible in any proportion with cold and warm water.

The dye dispersion according to the invention can be prepared direct from the dye filter cake which contains the dye in the form of an alkali metal salt or partly in the form of the free acid, for example by adding the metallizable dye of the type defined, preferably in the form of the sodium salt, either as pure substance or preferably as an aqueous filter cake at 20° to 70° C., preferably at room temperature, to an aqueous solution of the sulfonated condensation product of the type defined, which solution also contains any further additives, and dispersing the mixture with a stirrer advantageously from 30 minutes to 2 hours. If desired, the dye, preferably in the form of the sodium salt and as an aqueous filter cake, can be mixed with water at room temperature, temporarily heated to 40° to 70° C. and before or after cooling, but preferably after cooling, be admixed with the sulfonated condensation product of the type defined and any further additives and dispersed with a stirrer, advantageously from 30 minutes to 2 hours.

In the case of coarsely granular dye filter cakes. the dispersing can immediately be followed by wet grinding with glass beads.

The liquid formulation according to the invention is used, if desired after dilution with water, in particular for dyeing wool. Following uniform distribution of the dye in the fibre material to be dyed, the dye is fixed by progressive heating and metallized by means of polyvalent metal salts, preferably chromium salts, of which the best-known are the trivalent or hexavalent chromium salts, to obtain the desired wet- and lightfastness.

It is already known to employ aqueous dispersions of metallizable azo dyes which are insoluble or only very sparingly soluble in neutral or acid media. The dyes used for carrying out these processes either remain virtually insoluble with or without heating or have insufficient solubility on heating.

Surprisingly, by contrast, the dye formulations according to the invention, although they are insoluble within a specific pH range if not heated, have distinctly better solubility when heated. They thus exhaust uniformly on to the fibre, in particular without incurring ending, and produce dyeings which are fast, in particular fast to rubbing.

In the examples that follow, the percentages are by weight, unless otherwise stated.

EXAMPLE 1

A vessel equipped with a stirrer is charged with 12 g of the sodium salt of biphenylmethylnaphthalenesulfonic acid prepared as described in Example 3 of DE Offenlengsschrift No. 2,353,691, 8 g of 1,2-propylene glycol, 0.2 g of 2,4,7,9-tetramethyl-5-decyne-4,7-diol and 0.6 g of sodium hydrogensulfate in 67 g of water. 112 g of an aqueous press cake containing 56 g of the dye Mordant Black 11 C.I. 14645 are then added gradually and dispersed with a stirrer over 90 minutes.

Filtration through a 400 μm steel sieve affords 180 g of a storable homogeneous liquid formulation which has a pH of 1.9 and a viscosity at room temperature (25° C.)/12 revolutions per minute (rpm) of less than 2000 mPa.s. This liquid formulation is suitable for dyeing wool.

EXAMPLE 2

By analogy with Example 1, 282 g of an aqueous press cake containing 145.5 g of the dye Mordant Black 11 C.I. 14645 are initially introduced together with 25 g of the sodium salt of biphenylmethylnaphthalenesulfonic acid prepared as described in Example 3 of DE Offenlegungsschrift No. 2,353,691, 5 g of the sodium salt of polynaphthylmethanesulfonic acid, 20 g of 1,2-propylene glycol, 0.5 g of 2,4,7,9-tetramethyl-5-decyne-4,7-diol and 1.5 g of sodium hydrogensulfate in 166 g of water and dispersed with a stirrer for 90 minutes.

Filtration through a 400 μm steel sieve affords 465 g of a stable homogeneous liquid formulation which has a pH of 2.0 and a viscosity at room temperature (25° C./12 rpm) of 2400 mPa.s. This liquid formulation is suitable for dyeing wool.

EXAMPLE 3

By analogy with Example 1, 272.2 g of an aqueous press cake containing 140.5 g of the dye Mordant Black 11 C.I. 14645 are initially introduced together with 25 g of the sodium salt of biphenylmethylnaphthalenesulfonic acid prepared as described in Example 3 of DE Offenlegungsschrift No. 2,353,691, 12.5 g of a solution containing 5 g of a condensation product of a cresol mixture, the potassium salt of 2-naphthol-6-sulfonic acid, sodium sulfite and formaldehyde, 20 g of 1,2-propylene glycol, 0.5 g of 2,4,7,9-tetramethyl-5-decyne-4,7-diol and 1.5 g of sodium hydrogensulfate in 168 g of water and dispersed with a stirrer for 90 minutes.

Filtration through a 400 μm steel sieve affords 470 g of a stable homogeneous liquid formulation which has a pH of 2.0 and a viscosity at room temperature (25° C./12 rpm) of 2250 mPa.s. This liquid formulation is suitable for dyeing wool.

EXAMPLE 4

By analogy with Example 1, 203 g of an aqueous press cake containing 81.2 g of the dye Mordant Black 17 C.I. 15705 are initially introduced together with 22.5 g of the sodium salt of biphenylmethylnaphthalenesulfonic acid prepared as described in Example 3 of DE Offenlegungsschrift No. 2,353,691, 12 g of 1,2-propylene glycol, 0.3 g of 2,4,7,9-tetramethyl-5-decyne-4,7-diol and 0.9 g of sodium hydrogensulfate in 61 g of water and dispersed with a stirrer for 10 minutes. After addition of 600 g of glass beads (diameter 2 mm) the mixture is wet-ground for 90 minutes.

Filtration through a 400 μm steel sieve affords 240 g of a homogeneous dye dispersion which is highly fluid (120 mPa.s/12 rpm) at room temperature (25° C.) and is suitable for dyeing wool.

EXAMPLE 5

Example 1 is repeated, except that the Mordant Black 11 C.I. 14645 is replaced by a mixture of the dyes of the formulae

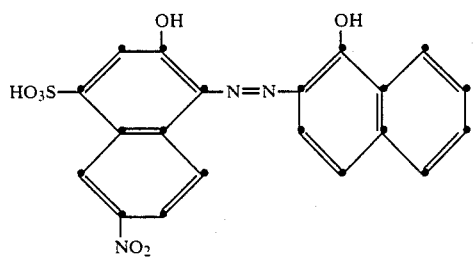

(3a)

and

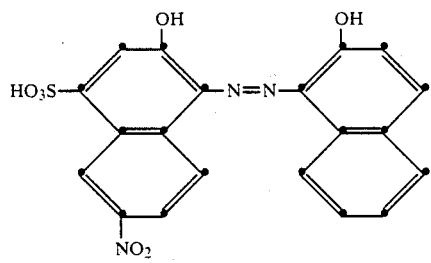

(3b)

likewise affording a stable homogeneous liquid formulation having similar physical properties. This formulation is suitable for the cheese dyeing of wool.

EXAMPLE 6

A vessel equipped with a stirrer is charged with 163 g of an aqueous press cake containing 80 g of the dye Mordant Black 11 C.I. 14645, 0.3 g of sodium hydrogensulfate. 0.1 g of 2,4,7,9-tetramethyl-5-decyne-4,7-diol and 110 g of water. The mixture is heated at 60° C. for one hour and, after cooling down to room temperature, is admixed with 18 g of the sodium salt of biphenylmethylnaphthalenesulfonic acid prepared as described in Example 3 of DE Offenlegungsschrift No. 2,353,691 and with 9 g of the condensation product of naphthalenesulfonic acid and naphtholsulfonic acid with formaldehyde (molar ratio 1:1:1) and dispersed for 30 minutes.

Filtration through a 400 μm steel sieve affords 285 g of a stable homogeneous liquid formulation which has a pH of 2.1 and a viscosity at room temperature (25° C.)/12 rpm of less than 2000 mPa.s. This liquid formulation is suitable for dyeing wool.

APPLICATION EXAMPLE

A 1 kg cheese of worsted wool yarn is pretreated at 40° C. at a liquor ratio of 1:9 with an aqueous liquor containing 0.8 g per liter of a wetting agent and 2% of acetic acid (80%) for 15 minutes. 120 g of the dispersion prepared as described in Example 1 and made up at 40° C. with 5 minutes' stirring to 1 liter of water are then added. The pH of the bath is 4.2. The bath temperature is raised to 98° C. at a rate of 1.5° C. per minute and is maintained at that level for 40 minutes. The bath is then cooled to 80° C. in the course of 10 minutes. admixed with 1% of potassium chromate and after 10 minutes brought to pH 3.5 with 85% formic acid. The temperature is increased to 98° C. and dyeing is continued for a further 40 minutes. After cooling down to 60° C. the wool is as usual rinsed hot and cold, soured off and dried. The result obtained is a black-dyed worsted yarn. The dyeing is level and has good fastness properties.

What is claimed is:

1. An aqueous dispersion of a mordant dye which comprises
   (a) at least 10% of a mordant dye, based on the total weight, and
   (b) a sulfonated condensation product, which is obtained by reaction of a monocyclic or polycyclic aromatic compound having at least two replaceable ring-positioned hydrogen atoms with a compound of the formula

(1)

in which X is the direct bond or oxygen, Hal is chlorine or bromine and n is 1 to 4, and sulfonation.

2. An aqueous dispersion according to claim 1, wherein the dye is a mordant black.

3. An aqueous dispersion according to claim 1, wherein the dye is Mordant Black 11 C.I. 14645.

4. An aqueous dispersion according to claim 1, wherein the sulfonated condensation product is obtained by using a binuclear aromatic hydrocarbon which is unsubstituted or substituted by hydroxy, alkyl having 1 to 4 carbon atoms, alkoxy having 1 to 4 carbon atoms or halogen.

5. An aqueous dispersion according to claim 4, wherein the sulfonated condensation product is obtained by using a naphthalene compound which is unsubstituted or substituted by hydroxy, chlorine or methyl.

6. An aqueous dispersion according to claim 1, wherein the dye is present in an amount of 20 to 60 percent by weight, based on the total weight.

7. An aqueous dispersion according to claim 1, wherein the dye is present in an amount of 25 to 40 percent by weight, based on the total weight.

8. An aqueous dispersion according to claim 1, wherein 5 to 40 parts by weight of the sulfonated condensation product per 100 parts by weight of dye are present.

9. An aqueous dispersion according to claim 1, which has a pH of 1 to 4.

10. The aqueous dispersion of claim 8, wherein the pH is 1.5 to 3.

11. A process for preparing the aqueous dispersion according to claim 1, which comprises dispersing the mordant dye as a free acid or alkali metal salt in the form of an aqueous filter cake at 20° to 70° C., with or without the addition of water, in an aqueous solution of the sulfonated condensation product.

12. A method of dyeing wool which comprises the step of applying to wool an aqueous dispersion of a sulfonated metallizable dye which comprises (a) at least 10% of a sulfonated metallizable dye, based on the total weight, and
(b) a sulfonated condensation product, which is obtained by reaction of a monocyclic or polycyclic aromatic compound having at least two replaceable ring-positioned hydrogen atoms with a compound of the formula

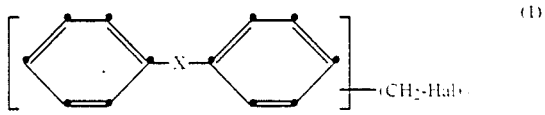

in which X is the direct bond or oxygen, Hal is chlorine or bromine and n is 1 to 4, and sulfonation.

13. A method of claim 12 wherein the dye is a mordant dye.

14. A method of claim 12 wherein the dye is a mordant black.

15. A method of claim 12 wherein the dye is Mordant Black 11 C.I. 14645.

* * * * *